United States Patent
Fullana Font et al.

(10) Patent No.: US 9,616,595 B2
(45) Date of Patent: Apr. 11, 2017

(54) METHOD FOR REMOVING INK PRINTED ON PLASTIC FILMS

(71) Applicant: UNIVERSIDAD DE ALICANTE, Alicante (ES)

(72) Inventors: Andrés Fullana Font, Alicante (ES); Agustin Lozano Morcillo, Valencia (ES)

(73) Assignee: Universidad de Alicante, Alicante (ES)

( * ) Notice: Subject to any disclaimer, the term of this patent is extended or adjusted under 35 U.S.C. 154(b) by 294 days.

(21) Appl. No.: 14/388,763

(22) PCT Filed: Mar. 13, 2013

(86) PCT No.: PCT/ES2013/070161
§ 371 (c)(1),
(2) Date: Sep. 26, 2014

(87) PCT Pub. No.: WO2013/144400
PCT Pub. Date: Oct. 3, 2013

(65) Prior Publication Data
US 2015/0298360 A1 Oct. 22, 2015

(30) Foreign Application Priority Data
Mar. 26, 2012 (ES) .................... 201200320

(51) Int. Cl.
| | |
|---|---|
| B02C 23/20 | (2006.01) |
| B29B 17/02 | (2006.01) |
| C09D 9/00 | (2006.01) |
| B02C 23/40 | (2006.01) |
| B29L 9/00 | (2006.01) |
| B29L 7/00 | (2006.01) |
| B29K 105/00 | (2006.01) |
| B29K 23/00 | (2006.01) |

(Continued)

(52) U.S. Cl.
CPC .............. B29B 17/02 (2013.01); B02C 23/20 (2013.01); B02C 23/40 (2013.01); C09D 9/00 (2013.01); *B29B 2017/0289* (2013.01); *B29K 2023/06* (2013.01); *B29K 2023/12* (2013.01); *B29K 2067/003* (2013.01); *B29K 2077/00* (2013.01); *B29K 2105/0032* (2013.01); *B29L 2007/008* (2013.01); *B29L 2009/006* (2013.01); *Y02W 30/622* (2015.05)

(58) Field of Classification Search
None
See application file for complete search history.

(56) References Cited

FOREIGN PATENT DOCUMENTS

| | | |
|---|---|---|
| EP | 1162518 A2 | 12/2001 |
| EP | 1419829 A1 | 5/2004 |

OTHER PUBLICATIONS

International Search Report, Spanish Patent Application No. PCT/ES2013/070161 dated Jul. 8, 2013.

*Primary Examiner* — Mark Rosenbaum
(74) *Attorney, Agent, or Firm* — Arent Fox LLP

(57) ABSTRACT

The present invention relates to a method for removing ink printed on a plastic film comprising various physical/chemical treatments. The main steps in the method are: conditioning the material, grinding, removing ink from the film, washing the film, recovering the cleaning solution, recovering the pigment and drying the film. As a result of the method, it is possible to obtain, on one hand, a plastic film free of ink and, on the other hand, the pigment. Said products may be reused in industry, thereby enhancing the value chain of the product.

11 Claims, 2 Drawing Sheets

(51) Int. Cl.
*B29K 67/00* (2006.01)
*B29K 77/00* (2006.01)

METHOD FOR REMOVING INK PRINTED ON PLASTIC FILMS

CROSS-REFERENCE TO RELATED APPLICATIONS

This application is a National Stage entry of International Application No. PCT/ES2013/070161, filed Mar. 13, 2013, which claims priority to Spanish Patent Application No. P201200320, filed Mar. 26, 2012. The disclosures of the prior applications are hereby incorporated in their entirety by reference.

FIELD OF THE INVENTION

The present invention relates to a novel method for removing ink printed on a plastic film the nature of which may vary. Some examples of plastic films that can be used in the described method are polyethylene (PE), polypropylene (PP), film of polyester (PET) and polyamide (PA).

PRIOR STATE OF THE ART

The process of printing on a flexible packaging consists of applying liquid ink on a plastic film. The solvent used (normally organic compounds or water), which volatilizes, is then removed by means of a drying process. The desired drawing is printed on the film after evaporation and it is ready for use as packaging for various products. It is common to adjust the parameters of the printing machine and to adjust the different colors used during said printing in order to obtain quality printing that has no imperfections. Most of the waste is generated during this stage. The plastic film circulates through the printer at speeds that can reach up to 500 meters per minute during machine adjustment. Large amounts of plastic film which do not have the quality required for use in the final packaging applications are generated due to this speed.

Some of the most widely used supports in this process are films of polyethylene, polypropylene or polyester, etc. Due to the adjustment described above, the printing industries have a large amount of losses that can reach up to 5-10% of their total packaging film production. The printed material that can be recycled with the method herein proposed comes essentially from said losses and from the material used by undertakings in the final application thereof.

Currently, such material is recovered for recycling by means of processes in which the printed ink is not removed. A low-quality brownish or black film is thus obtained, so its price is significantly lower than the price of films free of starting ink. Therefore, it is usually used for the preparation of trash bags or applications of low visual quality.

Some patents relating to different variants of the same concept can be found:
Apparatus for regenerating recording medium—U.S. Pat. No. 5,621,939 A.
Method and apparatus for recycling printed plastic films—EP1 419 829 A1.
Process for the separation of printing ink from composite materials—CA2101181.

The invention U.S. Pat. No. 5,621,939 A relates to a treatment for removing ink from a printed paper, so the starting material is different. Furthermore, in this method the material is not ground and is processed directly, introducing the paper in a bath containing the cleaning solution.

The invention EP1419829 A1 relates to the removal of ink on printed films, but the method used is completely different, since the film is treated without being previously pelleted, and although the method of separation used is a chemical method, it is comprised of organic solvents and non-ionic surface active agents.

In relation to the last background document, the main difference consists of the material to be treated. The invention CA2101181 consists of a process for recycling multilayer composite containers formed by a polymer layer, another metal layer (generally aluminum) and another paper or cardboard layer. The printed ink which is removed by means of water vapor is usually found on the sheet of paper or cardboard. Part of the ink that sticks to the plastic film is separated by means of dissolution with a solvent and separation on grounds of the density of the metallic part and the non-printed film, so neither the principle of separation nor the starting material were the same as those of the invention.

Therefore, the methods patented today do not provide any global solution to the problem of removing ink on printed films, whereas the invention herein proposed does indeed solve this problem.

BRIEF DESCRIPTION OF THE INVENTION

In light of the foregoing, there is a need to seek a global solution to the problem of removing ink on printed films.

The main advantage of the method herein described is that it allows separating the printed ink and obtaining a film cleaned of ink by means of an economically viable solution, increasing the added value of the recovered product. Furthermore, pigments which can be used in other applications are also obtained, whereby waste is reduced to the minimum possible.

Given the increase in costs derived from raw materials, making better use of the waste from plastics printing is increasingly necessary to reduce production costs and this method is ideal to achieve said purpose.

With the present invention, two products are obtained from the printed film: pigments which can be reused for the same and other applications after treatment, such as, the one described in patent ES2344778 B1, for example, and the recycled colorless film in the form of pellets which can also be reused, said colorless film being a product of higher quality than the colored film.

The present invention therefore relates to a method for removing ink contained in the plastic film by means of using different physical/chemical treatments. By means of the present invention the technical problem involved in the recycling of the printed film is resolved by obtaining a product free of ink suitable for recycling in any type of application due to the high quality and purity thereof. The method herein described can be used on the printed product that has already been used by the end user, or on printing materials formed by production waste, in which case the material tends to be in the form of jumbos (rolls of material having a width of 1.5 m and variable thickness) or of smaller and thinner rolls, as well as dispersed material.

The steps of the method are described below.
Step 1: Conditioning the Material
The first step of the invention consists of conditioning the material. To that end, the cylindrical core, usually made of cardboard, where the film is supported is removed to make the grinding operation easier. This is achieved by manually or mechanically removing the core from the reels of plastic film.
Step 2: Grinding
The second step of the method is to grind the rolls of film to a size that can vary from 6 to 14 mm in diameter for subsequent cleaning. To that end, the rolls of film are introduced in a blade grinder having both moving and fixed blades.

Step 3: Removing Ink from the Film

In the third step of the method, the operation of cleaning the printed film, i.e., the stage where the plastic film is separated from the printed ink, is performed. To that end, the ground material from the grinder is introduced in the cleaning system. The cleaning system is formed by three tanks, a cleaning tank and two washing tanks. In addition to the film, suitable cleaning agents which cause the separation of the ink from the plastic film are added to the cleaning tank. The operation is preferably performed under basic conditions. This step is performed in a discontinuous manner for the case of the film, and to that end, the cleaning tank is loaded with the ground material from step 2. Necessary amounts of water, cleaning agents and bases are added and the content of the tank is stirred using vane stirrers with the suitable configuration. The ink which has been removed from the film is extracted continuously while cleaning. To that end, a water flow containing the cleaning solution and the ink is extracted.

The steps are carried out in parallel starting from this moment, the film is washed (step 4) and dried (step 7) on one hand, and the cleaning solution (step 5) and the pigment (step 6) are recovered on the other hand.

Step 4: Washing the Film

Once treated with the cleaning solution, the ground film must be introduced in a new washing tank to remove dispersed ink residues and cleaning solution residues that may remain. This operation is performed as many times as required until the plastic film has been washed completely and does not have neither the ink nor the cleaning agents.

Step 5: Recovering the Cleaning Solution

The cleaning solution which has been generated in step 3 is fed to the centrifuge for recovering the same. The centrifuge works continuously while the cleaning operation takes place in the tank of step 3 and the solid ink is separated from the cleaning solution. Therefore, after the treatment two flows exit, one flow being the ink and another flow being the cleaning solution. In this manner, the method is more environmentally and economically favorable, since the cleaning solution can be reused in the cleaning tank, and the ink can be treated for recovering the pigment and for use in various applications after thermal treatment.

Step 6: Recovering the Pigment

The thermal treatment consists of a thermal treatment reactor in which heating is provided and the function of which is to break down the resin for obtaining recycled pigment.

Step 7: Drying the Film

Finally and after washing the film which was performed in step 4, the plastic film must be dried to remove the remaining water content. To that end, the wet material is passed through a mechanical separation element such as a briquette machine to remove the largest amount of water possible or drying is performed by means of hot air.

DETAILED DESCRIPTION OF EMBODIMENTS

Figure 1:
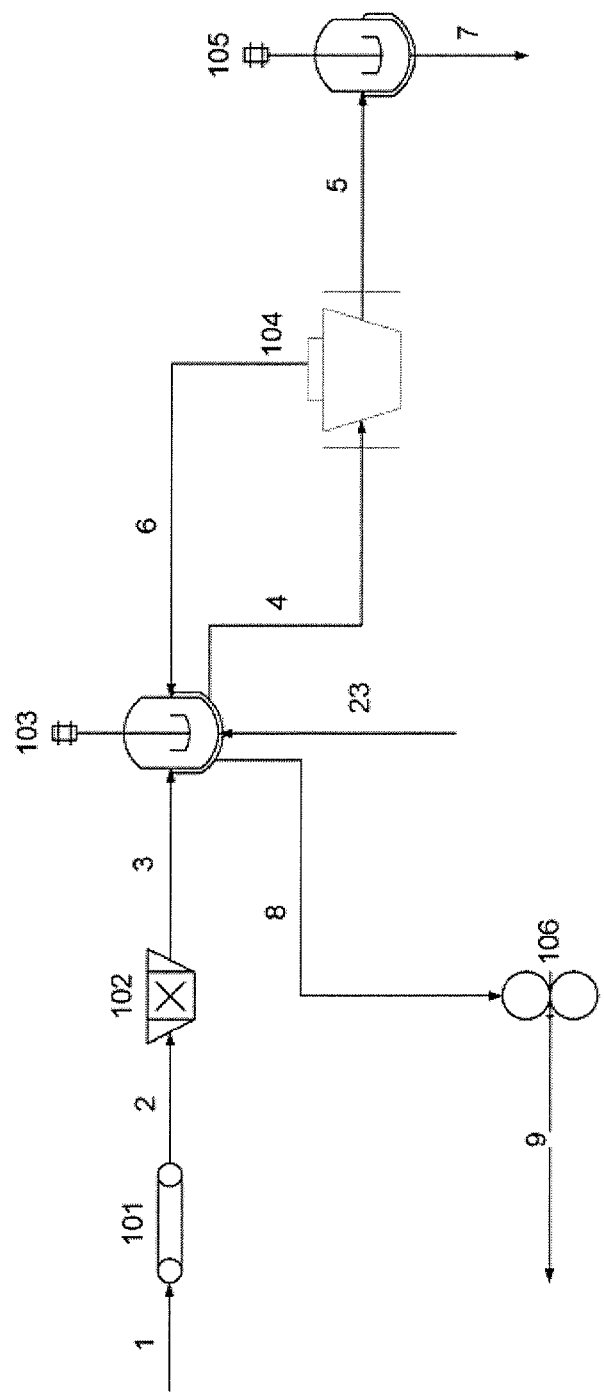
FIG. 1 shows a diagram of the method object of this invention as well as the pieces of equipment involved in the invention.

The preferred embodiment of the method described in the present invention is described below in view of the drawings.

The method for removing ink printed on the plastic film comprises the following steps:

Step 1: Conditioning the Material

The input printed material 1 can be polyethylene (PE), polypropylene (PP), film of polyester (PET) or polyamide (PA). Once the input printed material 1 is collected, a conditioning step is performed in which the cores where the film as well as any object the composition of which is not of a plastic film in the form of a jumbo or dispersed material are removed. The equipment responsible for removing the core supporting the plastic 101 consists of a plunger that applies force on the cylindrical core and keeps the roll of plastic film fixed. The cylinder is separated from the plastic body by applying pressure. Once conditioning is performed, a film by-product free of impurities 2 containing the rolls of film without the cores and the input dispersed material is obtained.

Step 2: Grinding

The particle size of the film free of impurities 2 must be reduced to a diameter that can vary from 6 to 14 mm to favor the penetration of the cleaning solution. To that end, it is introduced in a blade grinder 102 comprising both fixed and moving blades. This grinder reduces the size of the film until obtaining a ground material 3.

Step 3: Removing Ink from the Film

Figure 2:
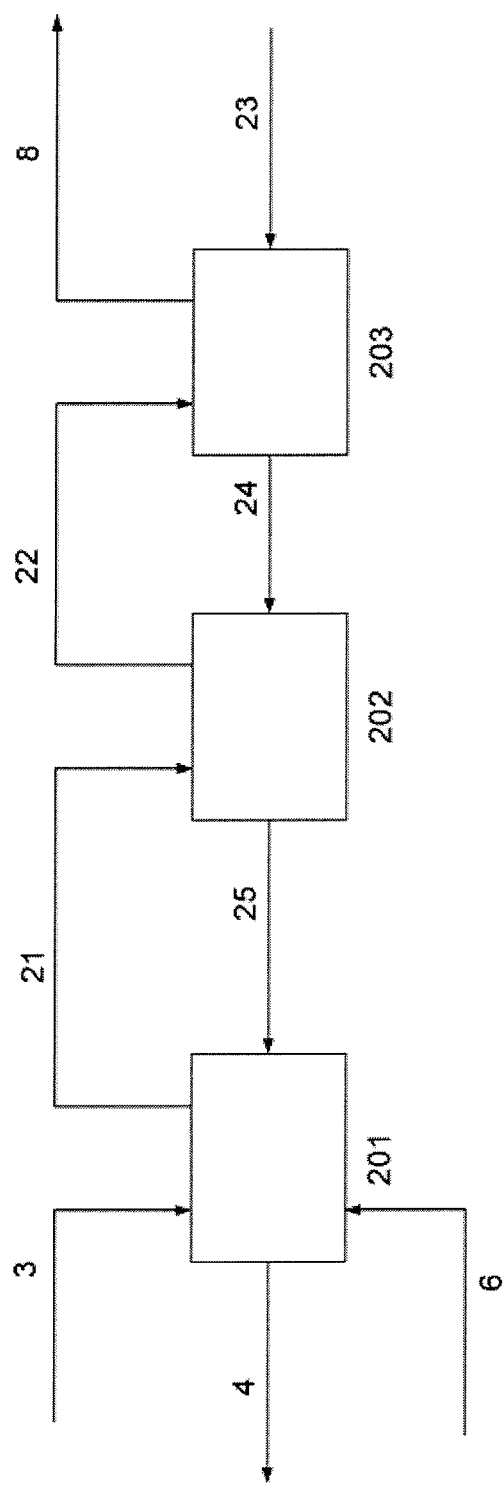
FIG. 2 shows a detailed diagram of the cleaning system of the method for removing ink from the printed film.

The ink must be removed from the ground material 3, so it is introduced in the cleaning system 103 with the cleaning solution 6 consisting of a mixture of surfactants in water, at proportions between 0.1 and 5% by weight, and with a basic pH between 11 and 13, where the ink contained in the film is removed, the ink then becoming part of the cleaning solution in a non-dissolved form. In a preferred embodiment, the surfactants of the cleaning solution are hexadecyltrimethylammonium bromide, dodecyltrimethylammonium bromide or dodecyl sulfate. The cleaning system 103 consists of the system formed by three tanks which is shown in FIG. 2. The cleaning tank 201 is a tank stirred with vanes where the plastic film is contacted with the cleaning solution 6. The other two tanks are washing tanks that start operating in the subsequent step. Three flows enter this cleaning system 103, i.e., the flow containing the ground material 3, the flow containing the cleaning solution 6 and the flow containing clean water; and another two flows that are described below exit said system. The flow containing the ground material 3 enters the cleaning system 103 feeding the cleaning tank 201. The cleaning solution 6 from the centrifuge 104 also enters this cleaning tank. It is very important for the vanes of the cleaning tank 201 to cause high turbulence inside the tank stirred with vanes in order to prevent the pieces of ground film from overlapping with one another, and to therefore increase method efficiency. Furthermore, the turbulence also favors the dispersion of the ink that detaches from the film in the cleaning solution 6. On one hand, the treated plastic film 21 containing cleaning solution and dispersed ink residues exits the cleaning tank 201, and, on the other hand, the cleaning solution together with the ink removed from the film 4 exits the cleaning tank 201 towards the centrifuge 104.

Step 4: Washing the Film

Two consecutive washing methods are performed in the same cleaning system 103 in two washing tanks with vanes. The cleaning tank 201 is washed with water in the first washing tank 202. The film from the first washing tank 202 is contacted with clean water in the second washing tank 203 to remove cleaning solution residues. The treated plastic film 21 is introduced in the first washing tank 202 to remove dispersed ink residues and cleaning solution residues. The washing liquid 25 that exits the first washing tank 202 is fed to the cleaning tank 201 in order to save water. The washed plastic film 22 containing cleaning solution residues exits the first washing tank 202 and is fed to the second washing tank 203. This second washing removes the last cleaning solution residues that may remain in the plastic. Two flows exit the second washing tank 203, i.e., one flow containing the clean film free of ink and cleaning solution residues 8 that is fed to the briquette machine 106; and another flow containing the washing water 24 that is fed to the first washing tank 202 to save water.

Step 5: Recovering the Cleaning Solution

The cleaning solution together with the ink removed from the film 4 must be continuously regenerated by means of using a centrifuge 104, at 10,000 revolutions per minute. This equipment consists of a centrifugal separator for separating the cleaning solution 6 from the ink 5. The cleaning solution 6 is reintroduced in the cleaning system 103 reducing the consumption of cleaning solution that the method would have, in case said solution was not reused.

Step 6: Recovering the Pigment

The flow containing the ink 5 is fed to an ink thermal treatment reactor 105 in order to destroy the structure of the resin and the pigment ready to be reused 7 exits said reactor. The thermal treatment reactor works at a temperature between 170 and 200° C. A mixture of pigment and oil is introduced in the reactor, where the resin containing the pigment is thermally destroyed. Both plant oil, such as, for example, sunflower seed oil or linseed oil, and mineral oil from petroleum can be used. The reactor operates with vigorous stirring and the mean residence time of the pigment is 1 hour. The mixture is filtered after the treatment to separate the pigment from the oil and the oil is reintroduced into the reactor to continue treating more pigment. The pigment is thereby free of resin and can be used in various applications.

Step 7: Drying the Film

The clean film free of ink and cleaning solution residues 8 is formed by the clean film after the ink 5 has been removed and washed with the cleaning solution 6. This plastic is introduced in the briquette machine 106 consisting of a drying element which removes the largest amount of water possible by means of pressing and compacting the material. A flow containing a ground film free of ink and cleaning solution 9 ready for use in other applications exits the briquette machine 106.

As mentioned previously, two products, on one hand, the pigments and, on the other hand, the colorless recycled film in the form of pellets, are generated from this method.

The invention claimed is:

1. A method for removing ink printed on a plastic film comprising the following steps;
    a) conditioning the input printed material in a plunger obtaining a film free of impurities;
    b) grinding the film free of impurities in a grinder;
    c) removing ink from the film in a cleaning system with a cleaning solution consisting of surfactants in water at basic pH, where a cleaning tank stirred with vanes generates a treated plastic film containing part of that cleaning solution and the dispersed ink residues, and in addition, the cleaning solution together with the ink removed from the film;
    d) washing the treated plastic film in the preceding cleaning system where at least two washing tanks obtain a clean film free of ink and cleaning solution residues;
    e) recovering the cleaning solution in a centrifuge;
    f) recovering the pigment in a thermal treatment reactor; and
    g) drying the film for obtaining a ground film free of ink and cleaning solution in a drying element.

2. The method for removing ink printed on a plastic film according to claim 1, where the input printed material can be polyethylene (PE), polypropylene (PP), film of polyester (PET) or polyamide (PA).

3. The method for removing ink printed on a plastic film according to claim 1, where the size of the film free of impurities after grinding is 6 to 14 mm in diameter.

4. The method for removing ink printed on a plastic film according to claim 1, where the cleaning solution contains a proportion of surfactants in water between 0.1 and 5% by weight.

5. The method for removing ink printed on a plastic film according to claim 4, where the cleaning solution contains hexadecyltrimethylammonium bromide, dodecyltrimethylammonium bromide or dodecyl sulfate as surfactants.

6. The method for removing ink printed on a plastic film according to claim 4, where the cleaning solution has a pH between 11 and 13.

7. The method for removing ink printed on a plastic film according to claim 1, where the washing step is performed in two washing tanks, the first tank with recirculated water and the second tank with clean water.

8. The method for removing ink printed on a plastic film according to claim 1, where the centrifugation speed is 10,000 revolutions per minute.

9. The method for removing ink printed on a plastic film according to claim 1, where the thermal treatment reactor works by vigorous stirring at a temperature between 170 and 200° C. for 1 hour, where from a mixture of pigment and plant or mineral oil, the resin containing the pigment is thermally destroyed, and the mixture is filtered after the treatment to separate the pigment from the oil and the oil is reintroduced into the reactor to continue treating more pigment.

10. The method for removing ink printed on a plastic film according to claim 1, where the drying step is performed by means of a briquette machine.

11. The method for removing ink printed on a plastic film according to claim 1, where the drying step is performed by means of hot air.

* * * * *